No. 635,986. Patented Oct. 31, 1899.
C. F. UEBELACKER.
CAR TRUCK.
(Application filed Oct. 25, 1897.)
(No Model.) 3 Sheets—Sheet 2.
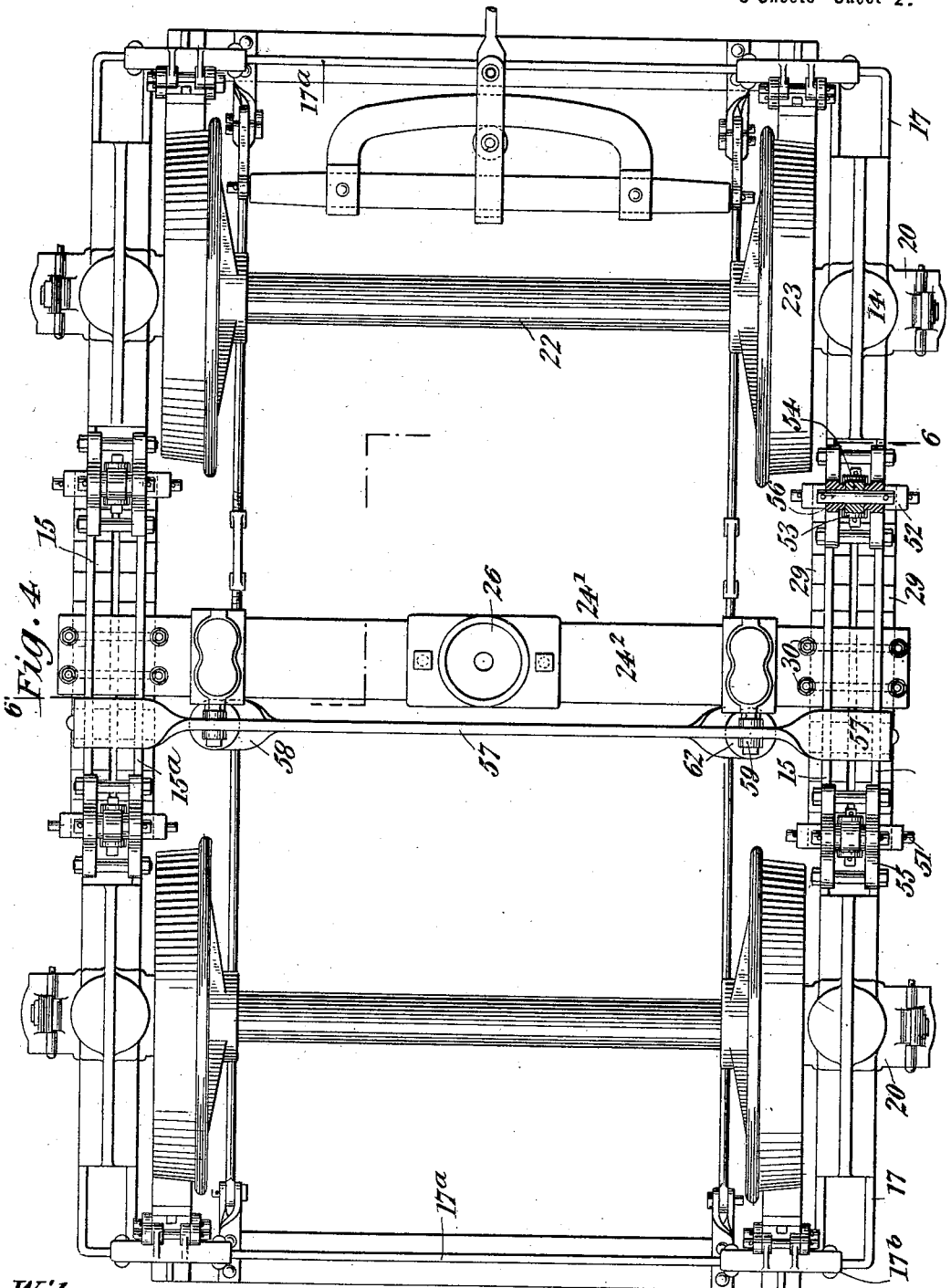
Witnesses:
Raphaël Netter
M. C. Pinckney
Inventor
Charles F. Uebelacker,
By J. E. M. Bowen
Attorney

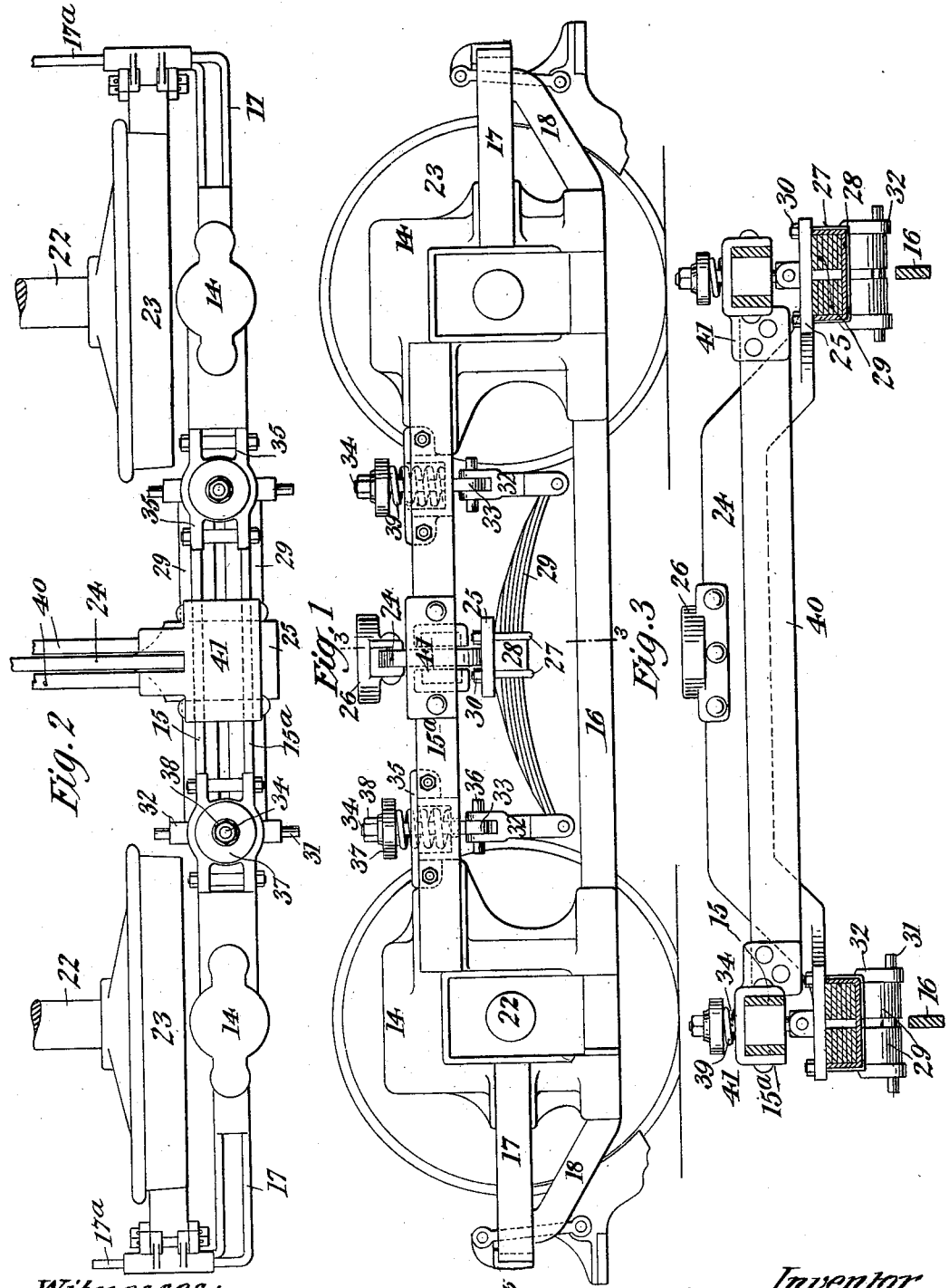

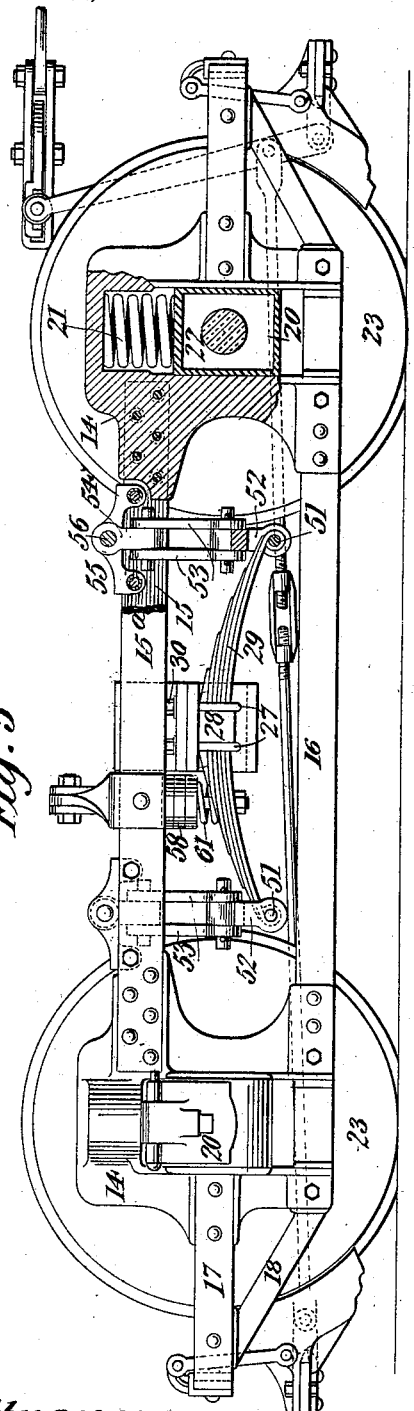

UNITED STATES PATENT OFFICE.

CHARLES F. UEBELACKER, OF KINGSTON, NEW YORK, ASSIGNOR TO THE PECKHAM MOTOR TRUCK AND WHEEL COMPANY, OF SAME PLACE.

CAR-TRUCK.

SPECIFICATION forming part of Letters Patent No. 635,986, dated October 31, 1899.

Application filed October 25, 1897. Serial No. 656,331. (No model.)

*To all whom it may concern:*

Be it known that I, CHARLES F. UEBELACKER, a citizen of the United States, and a resident of Kingston, Ulster county, State of New York, have invented certain new and useful Improvements in Car-Trucks, of which the following is a specification.

This invention relates to improvements in car-trucks intended particularly for elevated or heavy surburban electric cars. The improvements are likewise adapted for cable or other street-railways.

The truck is of that class known as "double" trucks employed for supporting long car-bodies, the car being mounted upon a pair of the trucks.

The object of the present improvements is to construct a truck particularly adapted for carrying heavy car-bodies in high-speed service which shall support upon it a car-body through the instrumentality of a suitable center-bearing bolster in such manner that longitudinal as well as transverse movement of the car-body and supporting-bolster with relation to the truck structure may be provided for, so as to neutralize shocks imparted to the truck before such shocks can be transmitted to and affect the car-body. I accomplish this and other useful objects by the means hereinafter described, and more particularly set forth in the claims at the end of this description.

The accompanying drawings, forming part of this specification, illustrate in Figures 1, 2, and 3 a truck embodying my improvements, the remaining views showing a truck embodying the leading features of the invention. Fig. 1 is a side elevation of the truck; Fig. 2, a ground plan of one side of the same; and Fig. 3, a vertical cross-section along line 3 3 of Fig. 1, looking toward the left. Fig. 4 is a ground plan of a somewhat modified form of the truck; Fig. 5, a side elevation, partly in section; and Fig. 6, a vertical cross-section along line 6 6 of Fig. 4, looking toward the left. Portions of Figs. 4 and 5 appear broken away.

In the several views like features are indicated by the same numerals of reference.

The side frames of the truck comprise yokes or pedestals 14, upper longitudinal beams 15 15ᵃ, connecting the pedestals together at the top and preferably duplex, and lower longitudinal beams 16, connecting the pedestals together at the bottom, also end beams 17, connected to the pedestals 14 near the center of their vertical height, and preferably made duplex, as shown, and of less aggregate width than the upper longitudinal beams 15 15ᵃ and under truss-beams 18, extending from the outer lower ends of the pedestals 14 upward to the end beams 17, to which they are riveted. The central upper longitudinal beams 15 15ᵃ, which are the supporting-beams of the suspending appliances, are preferably placed farther apart than the end beams 17. This is to permit of the requisite swing of the links supporting the half-elliptic springs, which are suspended below said beams 15 15ᵃ, though, if desired, the end beams 17 may be spaced apart the same extent as the beams 15 15ᵃ, as in Fig. 4.

The truck has a short wheel-base, and its side frames are constructed to afford great strength, the beams being preferably made of soft steel, hot-riveted to the pedestals, which are likewise made of soft steel, the upper beams being inlaid in suitable flanged recesses on the faces of said pedestals before being riveted thereto. Lower beams 16 have their ends secured in pockets cast in the lower members of the pedestals before being riveted to the latter, and the under truss-beams 18 are in like manner secured to the pedestals. The outer members of the duplex end beams 17 are carried around transverse of the truck, as at 17ᵃ, and thus assist to hold the side frames in proper alinement. To the transverse end beams 17ᵃ are riveted the angle-beams 17ᵇ, which furnish supports for certain parts of the braking appliances. Braking mechanism is shown in the drawings, but forms no part of my present invention. The side frames of the truck as thus constructed afford the necessary stability for supporting the bolster and the weight imposed upon it at the wheel-base.

The journal-boxes are indicated at 20 and operate within the pedestals in the usual manner, 21 being spiral springs placed above the tops of the journal-boxes, (see Fig. 5,) said springs entering recesses in the top members of the pedestals 14 and serving to spring-cushion the truck on the journal-boxes. The truck-axles are marked 22 and the wheels 23.

Referring now to Figs. 1, 2, and 3, which embody the preferred construction, 24 indicates a swinging bolster, made of a heavy flat bar, set on edge, and having its ends sloped downward and outward beneath the duplex beams 15 15$^a$, its extreme end portions being constructed as horizontal base-plates 25. The bolster is provided with swivel-plate 26, to which the car-body is adapted to be connected in the usual manner. 27 27 indicate yokes supporting a central shoe 28, which envelops the leaves of the duplex half-elliptic springs 29. The ends of yokes 27 pass upward through the base-plates 25 and are held in place above the latter by screw-nuts 30. The ends of the springs 29 are bent around pins 31, which pass through the lower ends of the universal links 32 transverse to the truck, the upper central portions of said links being divided, so as to permit of inserting between the same the lower flattened heads 33 of bolts 34, which extend upward and are adapted to play between the duplex beams 15 15$^a$ and through shoes 35, secured to and between said beams 15 15$^a$, some lateral play being allowed to the bolts 34, so that they may accommodate themselves to changes in the spans and positions of the springs 29. By means of the pins 36 at right angles to pins 31 and longitudinally of the truck the lugs forming the upper portions of universal links 32 are articulated to the heads 33 of bolts 34. 37 is a washer, and 38 a nut on bolt 34, a spiral spring 39 being inserted within a suitable recess of shoe 35 and interposed between the bottom of said shoe and washer 37, so as to yieldingly resist vertical play of the bolt 34.

In the construction described the suspending devices or appliances for the semi-elliptic springs are increased in length by supporting the upper ends thereof from the upper edges of the upper side beams and preferably by supporting said upper ends at a distance above said upper edges. This is done in the construction of Fig. 1 by extending the springs 39, which support the bolts 34, a distance above said upper edges, as shown. This lengthening of the suspending appliances is found advantageous, particularly because it gives an easier swinging bolster. By means of the recess in bracket 35 the lengths of springs 39 are increased as they extend both above and below the supporting edges of the upper beams. This gives a good elastic support. The links 32 have a swinging motion on their supporting pivot-pins. There is also a further swing of the pivots themselves, owing to the elastic support at the upper ends. The latter motion, which may result from longitudinal movement of the bolster, compresses springs 39 more on one side of the spring than on the other, which tends to return the bolster to central position.

The numerals 40 indicate a pair of transverse bars or transoms of U-shaped cross-section fixedly secured to shoes 41, riveted to the duplex beams 15 15$^a$ and between which the bolster 24 operates. The transoms add stiffness to the truck-frame laterally and serve to hold the transverse end beams 17$^a$ in rigid alinement. They also serve as a guide for the bolster 24 to prevent its movement to any considerable extent in a direction longitudinal with the car-body, and they further serve to transfer the draft of the propelling-motors from the truck to the car-body.

The drawings show a pair of half-elliptic springs 29 at each side of the truck-frame for supporting the ends of the bolster; but a single spring may be used, or more than two, the number depending on the weight of the car-body to be carried by the truck. By providing for the swinging of the bolster longitudinally with relation to the truck the latter is permitted to start in advance of the car-body and to thus impart its movement to the car-body without abruptness owing to the action of springs 29, which, being capable of varying their span and being supported by links yieldingly suspended, will neutralize in a measure sudden shocks imparted to the truck. The location of the half-elliptic springs between the beams of the side frames of the truck permits the drawing down of the bolster to the narrowest permissible width, thus shortening the wheel-base of the truck. This location of the semi-elliptic springs also imparts to them the properties of an equalizer, permitting any of the wheels to rise independently of the car-body and supplementing in this way the action of the pedestal-springs 21, located directly over the journal-boxes.

Referring to Figs. 4, 5, and 6, it will be seen that the construction of the side frames of the truck is substantially the same as that shown in the views of the drawings above described. In Figs. 4 to 6 the bolster 24' is constructed as a truss, comprising a top chord 24$^2$, bottom chord 24$^3$, and suitable stays 24$^4$ between the central portion of said chords, which are held in place by bolts 24$^5$ in the usual manner. Each end of the bolster 24' is secured to the central shoe 28 of a pair of semi-elliptic springs 29 by yokes 27 and screw-nuts 30. The outer ends of said springs embrace pins 51, passing through the lower ends of yokes 52, forming parts of suspending appliances constructed similar to portions of chains, the upper links of which are represented by 53 and 54.

Fixedly secured to the duplex beams 15 15$^a$ are the brackets 55, carrying pivots 56, around which links 54, and with them lower links 53 and yokes 52, are adapted to swing, thus providing for changes in the spans of the springs 29 produced by varying loads and for the swinging of said springs and the car-body-supporting bolster resting thereon longitudinally as well as laterally with relation to the truck-frame. The bolster 24' may be guided between transoms secured to the duplex beams 15 15ª and when employed will perform the same functions as the transoms shown in Figs. 1 to 3.

A flexible support for the nose of an electric motor is embodied in the construction illustrated by Figs. 4 to 6, wherein 57 is a flat bar secured to the duplex beams 15 15ª a suitable distance from the bolster and set on edge, except at its ends, where it is deflected so as to fit over the top edges of the beams 15 15ª and against the outer surface of the outer beam 15ª. Yieldingly suspended from said bar 57 by bolts 59, forked at their upper ends around the bar 57, to which they are attached, is the bar 58, adapted to support the nose of the motor at a suitable elevation. The bar 58 is also flat and is set on edge, with its ends deflected into horizontal portions, through which the suspending-bolts 59 pass, the horizontal ends of the bar 58 being between suitable shoes 62, within which spiral springs 60 and 61, which surround bolt 59, seat, the said springs also seating in similar shoes 63 on bolt 59 above and below the shoes 62. By this arrangement the spiral springs 60 and shoes 62 are adapted to play up and down on bolt 59, thus affording to the bar 58 a suitably-yielding support.

I do not wish to confine myself to the details and combinations of details herein set forth, as it will readily be seen by those acquainted with truck-building that various modifications might be made as to same without departing from the spirit of my invention.

Having thus described my invention, what I claim as new, and desire to secure by Letters Patent, is—

1. In a car-truck, the combination with the side frames, comprising pedestals, duplex upper beams, and lower beams between the pedestals, of a car-body-supporting bolster, bolster-supporting spring-supports supported center-bearing from said side frames to permit the bolster to move vertically, and appliances suspended from the duplex upper beams of said side frames and sustaining the spring-supports for the bolster and permitting the latter to move transversely and longitudinally with reference to the side frames.

2. In a car-truck, the combination with the side frames including upper and lower longitudinal beams, of half-elliptic springs suspended between said upper and lower side beams and a car-body-supporting bolster consisting of a flat bar set on edge and provided with horizontal base-plates at each end, appliances connecting said base-plates to aforesaid half-elliptic springs, and link appliances connected to the ends of said springs and suspended from the upper longitudinal beams of the side frames.

3. In a car-truck having a short wheel-base, the combination with side frames having pedestals and upper longitudinal beams connecting the pedestals together, and two pairs of wheels and their axles and journal-boxes, of a center-bearing bolster, that is a bolster carrying the weight of the car-body solely in the center, the said bolster arranged transversely of the truck between the two pairs of wheels, springs upon which the ends of the bolster rest and to which they are connected, and suspending appliances connected to the ends of said springs and elastically supported at their upper ends on the said longitudinal beams.

4. In a car-truck having a short wheel-base, the combination with side frames having pedestals and upper longitudinal beams connecting the pedestals together, and two pairs of wheels and their axles and journal-boxes, of a center-bearing bolster, that is a bolster carrying the weight of the car-body solely in the center, the said bolster arranged transversely of the truck between the two pairs of wheels, springs upon which the ends of the bolster rest and to which they are connected, suspending appliances connected to the ends of said springs and elastically supported at their upper ends on the said longitudinal beams, and springs in the pedestals over the journal-boxes.

5. In a car-truck having a short wheel-base, the combination with side frames having pedestals and upper longitudinal beams connecting the pedestals together, and two pairs of wheels and their axles and journal-boxes, of a center-bearing bolster, that is a bolster carrying the weight of the car-body solely in the center, the said bolster arranged transversely of the truck between the two pairs of wheels, half-elliptic springs upon which the ends of the bolster rest and to which they are connected, and suspending appliances connected to the ends of said springs and elastically supported at their upper ends on the said longitudinal beams.

6. In a car-truck having a short wheel-base, the combination with side frames having pedestals and upper longitudinal beams connecting the pedestals together, of a center-bearing bolster, that is a bolster carrying the weight of the car-body solely in the center, half-elliptic springs supporting the bolster, suspending appliances for said springs supported from said beams and extending from a distance above the beams to the half-elliptic springs below the beams, and springs between said beams and the upper ends of said suspending appliances.

7. In a car-truck, the combination with side frames having pedestals and beams connecting them, of a bolster, springs 29 supporting the bolster, suspending appliances for said springs supported from said beams and extending from a distance above the beams to springs 29 below the beams.

8. In a car-truck, the combination with side frames having pedestals and beams connecting them, of a bolster, springs 29 supporting the bolster, suspending appliances for said springs supported by said beams and extending from a distance above the beams to springs 29 below the beams, and springs between the beams and the upper ends of the suspending appliances.

9. In a car-truck the combination with side frames having pedestals and beams connecting them, of a bolster, springs 29 supporting the bolster, suspending appliances for said springs supported by the upper edges of said beams, and springs between said beams and the upper ends of said suspending appliances, said springs supporting said appliance on the beams.

10. In a car-truck the combination with the frame having pedestals and side beams connecting them near the tops of the pedestals, of brackets on the beams, springs supported by the brackets and extending above them, suspending appliances supported by said springs, springs 29, and a bolster supported thereby.

11. In a car-truck the combination with the frame having pedestals and side beams connecting them near the tops of the pedestals, of brackets on the beams, the brackets having recesses extending below the supporting part of the bracket, springs supported by the brackets in said recesses and extending above them, suspending appliances supported by said springs, springs 29, and a bolster supported thereby.

12. In a car-truck the combination with a bolster and springs 29, of links 32, bolts 34 pivotally connected to the links, and means for elastically supporting said bolts from the upper ends thereof.

13. In a car-truck the combination with a side frame, a bolster, and springs 29, of links 32, pins 31 connecting said links and springs, bolts 34, and pivot-pins 36 at right angles to pins 31 and connecting the links and bolts.

14. In a car-truck the combination with a side frame, a bolster and springs 29, of links 32, pins 31 connecting said links and springs, bolts 34, pivot-pins 36 at right angles to pins 31 and connecting the links and bolts, and springs supporting the bolts 34 from the side frame.

15. In a car-truck the combination with a side frame, a bolster and springs 29, of links 32, pins 31 connecting said links and springs, bolts 34, pivot-pins 36 at right angles to pins 31 and connecting the links and bolts, a washer 37 held at the top of bolt 34, and a spring 39 supporting the washer and bolt.

16. In a car-truck the combination with a side frame having pedestals and duplex beams connecting the pedestals near the tops thereof, a bolster, and springs 29, of links 32, pins 31 connecting said links and springs, bolts 34, pivot-pins 36 at right angles to pins 31 and connecting the links and bolts.

17. In a car-truck the combination with pedestals and beams connecting them near the top, of a bolster, springs 29 below and supporting the bolster, links, pins extending in the direction transverse to the truck connecting said springs and links, pins at the upper ends of the links longitudinally of the truck, and means supported by the beams and connected to said longitudinal pins.

Signed at New York, in the county and State of New York, this 4th day of August, 1897.

CHARLES F. UEBELACKER.

Witnesses:
J. E. M. BOWEN,
C. HOLLOWAY.